May 29, 1951        H. J. VETTER ET AL        2,554,604
PLANTING DEVICE
Filed April 24, 1948        2 Sheets-Sheet 1
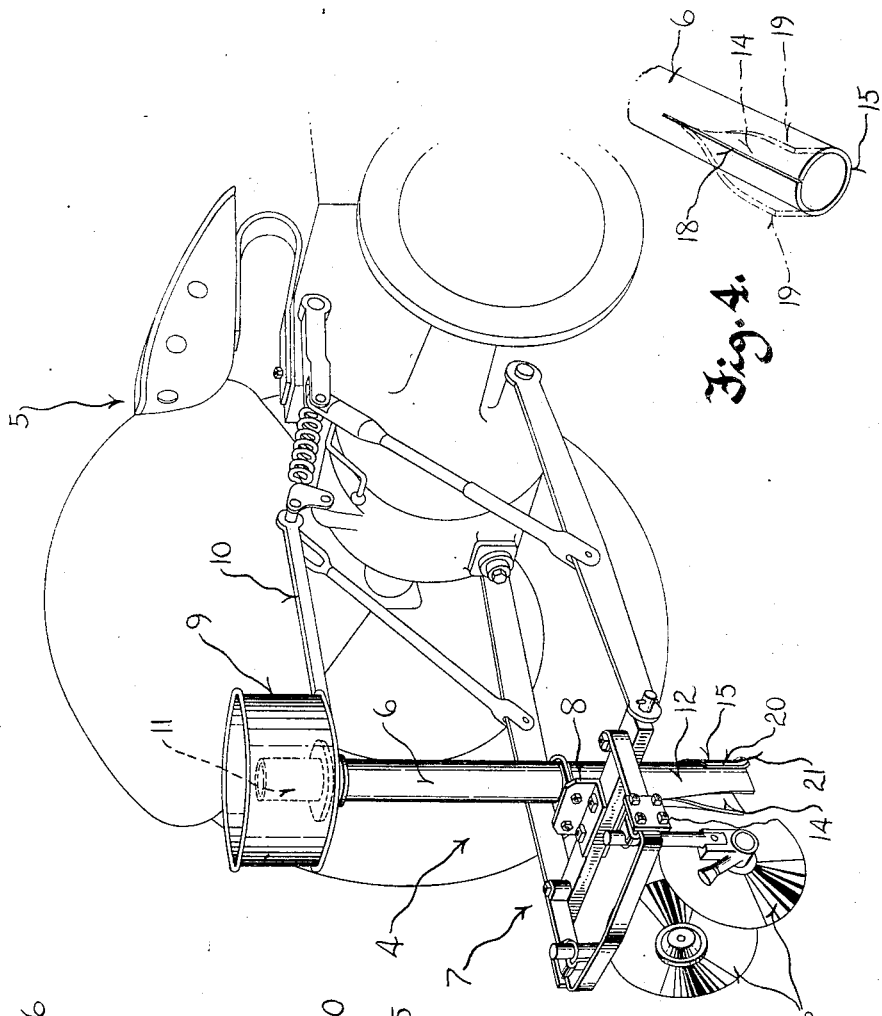
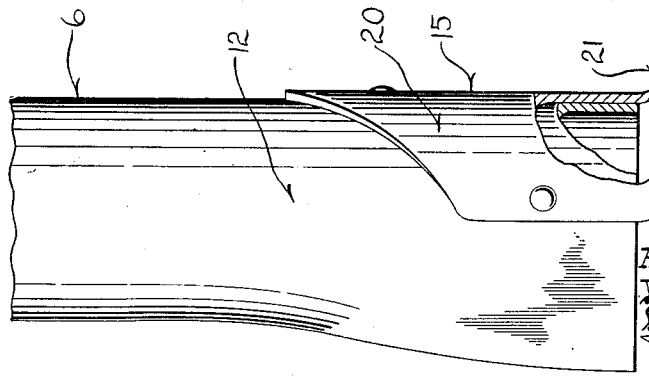
Inventors
Herman J. Vetter
Wilbur J. Vetter
By Ira Milton Jones
Attorney May 29, 1951  H. J. VETTER ET AL  2,554,604
PLANTING DEVICE
Filed April 24, 1948  2 Sheets-Sheet 2
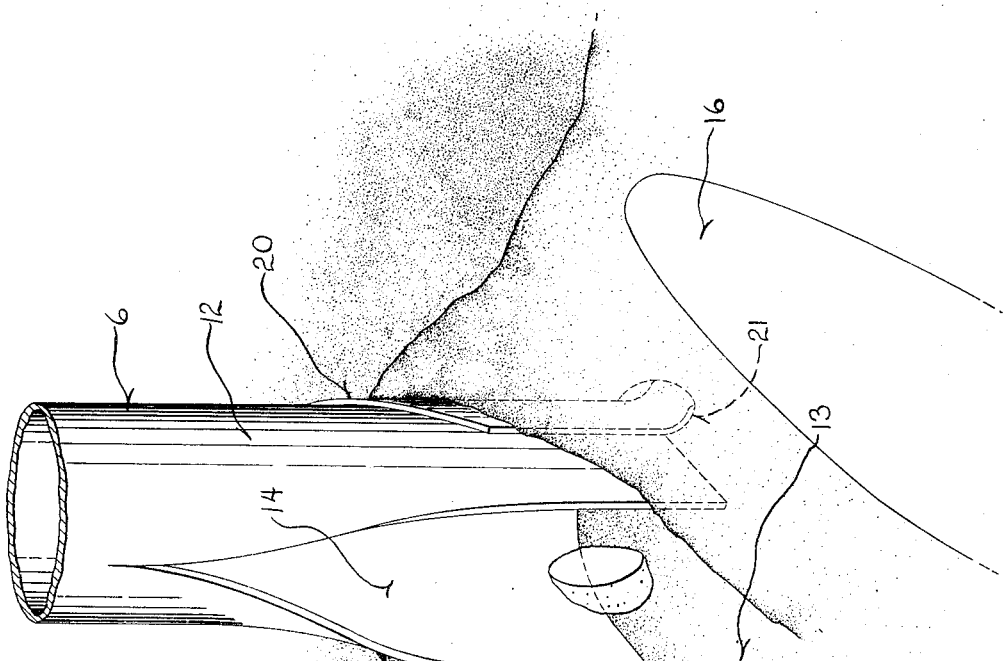
Fig. 2.
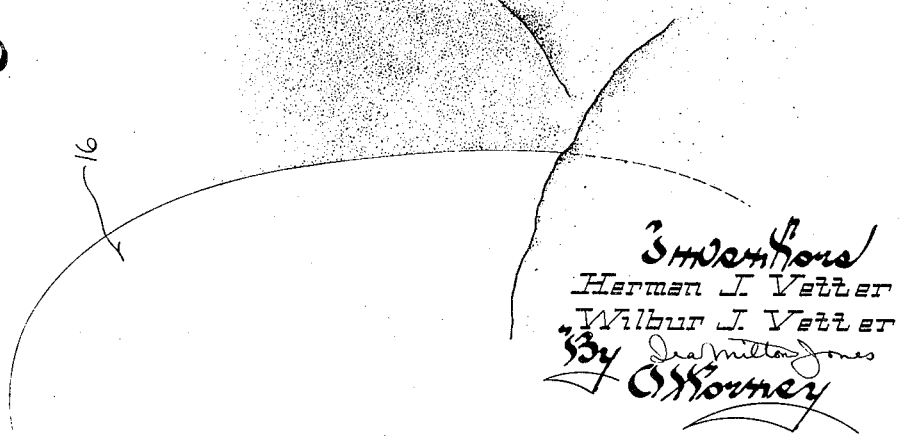
Inventors
Herman J. Vetter
Wilbur J. Vetter
By Ira Milton Jones
Attorney Patented May 29, 1951

2,554,604

UNITED STATES PATENT OFFICE 2,554,604

PLANTING DEVICE

Herman J. Vetter and Wilbur J. Vetter, Calvary, Wis.

Application April 24, 1948, Serial No. 23,058

1 Claim. (Cl. 111—86)

This invention relates to planting devices and has more particular reference to improvements in potato planters.

Potato planters now in use generally comprise a unit which is attachable to either a horse drawn or engine powered farm vehicle such as a tractor, and the potato sets to be planted are fed into the upper end of an elongated upright planting tube which directs the sets toward the bottom of a trench or furrow opened by a shovel ahead of the tube.

Previously, the lower open ends of the planting tubes were spaced well above ground level for clearance purposes, and the tubes merely acted to direct the potato sets fed therethrough toward the furrow or trench with the result that after discharging from the lower end of the tube, the sets traveled through space toward the bottom of the trench. This is objectionable, however, since the potato sets never reached the full plowed depth of the trench, but instead, were dropped onto soil which had collapsed inwardly from the sides of and partly filled in the trench.

With this objection in mind it is an object of the present invention to provide a potato planting device with a planting tube of improved construction wherein the trench or furrow is opened by the lower end of the tube itself, and wherein the potato sets are conveyed directly into the bottom of the trench by the tube.

More specifically it is an object of this invention to provide a planting device of the character described with a planting tube having an opening formed in the back of its lower end portion in a novel manner which provides reinforcement for said lower end of the tube.

Still another object of this invention is to provide a planting tube of the character described having deflector skirts at the opposite sides of its lower end portion which not only provide reinforcement for said lower end of the tube but have the additional function of holding the soil at the sides of the furrow plowed by the tube from inward collapse into the open back of the tube so as to assure the potato sets reaching the full plowed depth of the furrow.

With the above and other objects in view, which will appear as the description proceeds, this invention resides in the novel construction, combination and arrangement of parts substantially as hereinafter described and more particularly defined by the appended claim, it being understood that such changes in the precise embodiment of the hereindisclosed invention may be made as come within the scope of the claim.

The accompanying drawings illustrate one complete example of the physical embodiment of the invention constructed according to the best mode so far devised for the practical application of the principles thereof, and in which:

Figure 1 is a fragmentary perspective view of a farm tractor showing the potato planting device of this invention attached thereto;

Figure 2 is an enlarged perspective view of the lower end of the planting tube showing the function of the deflector skirts;

Figure 3 is an enlarged side view of the lower end of the planting tube with portions broken away and shown in section; and Figure 4 is a detail perspective view of the lower end of the planting tube illustrating the manner in which the opening at the back thereof is formed.

Referring now more particularly to the accompanying drawings in which like numerals indicate like parts, the numeral 4 generally designates a potato planting implement or device of the type which is attachable to a tractor 5 or the like to be drawn along the ground therewith. The planting implement or device includes an upright planting tube or pipe 6 of a diameter to easily accommodate pieces of potatoes to be planted and which is rigidly secured to the framework 7 of the unit, as by a clamp 8 near the lower end of the tube, and by a link 10 connecting the upper portion of the planting tube with the tractor.

A hopper or receptacle 9 is secured to the upper end of the tube or pipe 6 and is adapted to hold a supply of potato sets which are to be planted; and it will be noted in Figure 1 that the upper end 11 of the planting tube extends a distance upwardly into the receptacle 9 to facilitate feeding of potato sets into the tube.

In accordance with this invention, the lower end 12 of the planting tube is adapted to extend a distance into the ground up to eight inches in depth during use of the planting device so as to plow a trench or furrow 13 in the ground as the planting device is drawn along with the tractor or other farm vehicle to which it is attached. Hence the tube performs the dual function of plowing or opening the trench or furrow and of leading the potato sets directly to the bottom of the furrow.

The planting tube, of course, is open at its bottom and has an opening 14 in its back portion opposite the leading or plow face 15 of the tube the length of which back opening is at least equal to or slightly greater than the maximum depth of the furrow to be plowed. Hence, potato sets dropped into the upper open end 11 of the planting tube are deposited directly on the ground in the bottom of the furrow plowed by the lower end of the planting tube, it being understood that the opening 14 in the back of the tube allows the tube to pass over the potato sets thus received in the furrow.

The furrow plowed by the lower end of the planting tube is adapted to be closed and the potato sets hilled by a pair of discs 16 supported from the framework 7 of the planting attachment in a position straddling the furrow and trailing the lower end of the planting tube. As is customary, these discs are supported for rotation on axes substantially transverse to the furrow.

The opening 14 in the back of the planting tube or pipe 6 is provided in a novel manner without cutting away any of the metal of the planting tube, and hence without weakening the tube. As illustrated in Figure 4, it will be seen that the lower end of the tube terminates in a plane substantially normal to the axis of the tube and has a longitudinal slit 18 cut therein.

The length of the slit 18 preferably is greater than the normal planting depth which under usual instances is up to approximately eight inches, so that when the portions of the tube or pipe at either side of the slit are being bent outwardly as indicated best in Figures 2 and 4, these outwardly bent portions provide identical deflector skirts 19 on opposite sides of the pipe. As will be apparent from the drawings, these deflector skirts are provided solely by the back one-half of the pipe at its lower furrow forming portion with the deflector skirts flanking the opening in the back of the pipe and the rear edges of the deflector skirts defining the outline of the opening.

As best shown in Figure 2, the lower portions of the deflector skirts 19 are relatively flat and lie in planes tangent to the opposite sides of the pipe or tube and substantially parallel to one another, and with the direction of normal forward travel of the implement, and these relatively flat portions are high enough to project above the top of the furrow plowed by the tube. The upper portions of the deflector skirts are curved inwardly toward the cylindrical wall of the tube to merge therewith. The bottom edges of the deflector skirts are flush with the bottom of the tube or pipe and lie in a common plane normal to the axis of the tube, and the rear edges of the deflector skirts extend substantially perpendicularly from this bottom plane and gradually converge upwardly toward one another along the curved upper portions of the deflector skirts toward a point of confluence on the cylindrical wall of the tube at the back thereof.

Since the deflector skirts 19 comprise the entire back half of the lower portion of the tube or pipe, the distance from the rear edge of one deflector skirt around the front of the tube to the rear edge of the other deflector skirt measured at any level is substantially equal to the circumference of the tube.

Since no metal is cut away from the lower end of the planting tube for the provision of the opening 14 in its back, it will be readily appreciated that the tube is not weakened. The deflector skirts 19, in fact, provide substantial reinforcement for the lower plowing end of the planting tube by reason of the U-shaped cross section which they give to the tube. In this respect it will be noticed that the U-shaped cross section of the tube obtains from a point normally above the furrow plowed in the ground clear down to the lower extremity of the tube. Hence, the provision of a substantial amount of metal behind the plow face of the tube reinforces the same against bending or other damage.

For use in stony soil it is desirable to fix a hardened wear plate 20 over the plow face of the tube so as to prolong the life thereof. The wear plate may be riveted or otherwise permanently attached to the tube as shown in Figure 3, and its lower edge may be curled outwardly as at 21 to improve the plowing action.

From the foregoing description taken in connection with the accompanying drawings, it will be readily apparent to those skilled in the art that the combined trench forming and planting tube of the device of this invention is rendered exceptionally strong by the novel manner of forming the opening in the back of the tube, and that the deflector skirts which have the functions of reinforcing the plow end of the tube and preventing inward collapse of soil into the opening at the back of the tube assure the potato sets reaching the full plowed depth of the furrow. In addition, it is also to be appreciated that since the deflector skirts are integral with the lower end of the planting tube, reinforcement is achieved without additional expense.

What we claim as our invention is:

A potato planting implement of the type including an upright cylindrical planting tube having a plow face at the front thereof adapted to form a furrow in the earth as the implement is advanced and having an opening in the back of its lower end: characterized by the fact that the planting tube comprises a length of pipe of a diameter to easily accommodate pieces of potatoes to be planted; and further characterized by identical deflector skirts on opposite sides of the pipe provided solely by the back half of the pipe at its lower furrow forming portion, said deflector skirts flanking the opening with their rear edges defining the outline of the opening, and having relatively flat portions lying in planes tangent to the opposite sides of the pipe and substantially parallel to one another and with the direction of normal forward travel of the implement, the lower edges of said deflector skirts being flush with the bottom of the pipe and lying in a common plane normal to the axis of the pipe, and said deflector skirts extending upwardly a distance at least as great as the maximum planting depth for potatoes and curving inwardly at their upper portions toward the cylindrical wall of the pipe to merge therewith, the rear edges of said deflector skirts extending generally vertically from the bottom edges of the deflector skirts and gradually converging upwardly toward one another along the curving upper portions of the deflector skirts toward a point of confluence on the cylindrical wall of the pipe at the back thereof spaced a distance from the bottom of the pipe greater than the height of the flat portions of the deflector skirts, and the distance from the rear edge of one deflector skirt around the front of the pipe to the rear edge of the other deflector skirt measured at any and all levels beneath said point of confluence being substantially equal to the circumference of the pipe.

HERMAN J. VETTER.
WILBUR J. VETTER.

REFERENCES CITED

The following references are of record in the file of this patent:

UNITED STATES PATENTS

| Number | Name | Date |
|---|---|---|
| 29,801 | Mansfield | Aug. 28, 1860 |
| 261,942 | McDaniel | Aug. 1, 1882 |
| 290,233 | Hoskins | Dec. 18, 1883 |
| 372,126 | Crane | Oct. 25, 1887 |
| 508,930 | Forsyth | Nov. 21, 1893 |
| 594,669 | Williams | Nov. 30, 1897 |
| 832,907 | Harter | Oct. 9, 1906 |
| 1,416,331 | Campbell | May 16, 1922 |
| 1,452,417 | Culbertson | Apr. 17, 1923 |
| 2,047,293 | Schumacher | July 14, 1936 |
| 2,334,923 | Hand | Nov. 23, 1943 |

FOREIGN PATENTS

| Number | Country | Date |
|---|---|---|
| 363,634 | France | May 10, 1906 |